(12) United States Patent
Ryan

(10) Patent No.: US 6,666,029 B2
(45) Date of Patent: Dec. 23, 2003

(54) GAS TURBINE PILOT BURNER AND METHOD

(75) Inventor: William R. Ryan, Oviedo, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 61 days.

(21) Appl. No.: 10/010,980

(22) Filed: Dec. 6, 2001

(65) Prior Publication Data

US 2003/0106320 A1 Jun. 12, 2003

(51) Int. Cl.$^7$ .................................................. F23R 3/34
(52) U.S. Cl. ............................. 60/776; 60/737; 60/742; 60/748
(58) Field of Search ..................... 60/776, 737, 739, 60/742, 741, 748; 431/61, 182, 183; 239/411, 412, 417.3

(56) References Cited

U.S. PATENT DOCUMENTS

| | | | |
|---|---|---|---|
| 2,963,862 A | * 12/1960 | Jay | 60/742 |
| 4,157,012 A | * 6/1979 | DuBell | 60/39.465 |
| 4,337,616 A | * 7/1982 | Downing | 60/746 |
| 4,499,735 A | 2/1985 | Moore et al. | |
| 5,036,657 A | 8/1991 | Seto et al. | |
| 5,066,221 A | * 11/1991 | Becker | 60/748 |
| 5,193,346 A | * 3/1993 | Kuwata et al. | 60/737 |
| 5,199,265 A | 4/1993 | Borkowicz | |
| 5,349,812 A | 9/1994 | Taniguchi et al. | |
| 5,359,847 A | 11/1994 | Pillsbury et al. | |
| 5,361,586 A | 11/1994 | McWhirter et al. | |
| 5,373,694 A | 12/1994 | Clark | |
| 5,394,688 A | 3/1995 | Amos | |
| 5,450,725 A | 9/1995 | Takahara et al. | |
| 5,901,549 A | 5/1999 | Mandai et al. | |
| 5,901,555 A | 5/1999 | Mandai et al. | |
| 5,924,275 A | 7/1999 | Cohen et al. | |
| 5,941,698 A | 8/1999 | Darling et al. | |
| 5,983,622 A | 11/1999 | Newburry et al. | |
| 5,983,642 A | 11/1999 | Parker et al. | |
| 5,987,875 A | 11/1999 | Hilburn et al. | |
| 6,026,645 A | 2/2000 | Stokes et al. | |
| 6,038,861 A | 3/2000 | Amos et al. | |
| 6,070,411 A | * 6/2000 | Iwai et al. | 60/737 |
| 6,082,111 A | 7/2000 | Stokes | |
| 6,092,363 A | 7/2000 | Ryan | |
| 6,109,038 A | 8/2000 | Sharifi et al. | |
| 6,122,916 A | 9/2000 | Amos et al. | |

FOREIGN PATENT DOCUMENTS

| | | |
|---|---|---|
| JP | 6-213457 A | * 8/1994 |
| JP | 10-288339 A | * 10/1998 |

* cited by examiner

Primary Examiner—Ted Kim

(57) ABSTRACT

A dual circuit pilot burner fuel delivery arrangement (60) for a gas turbine engine combustor (18). A first fuel delivery circuit (64) delivers a gaseous fuel from a fuel supply (62) to a first diffusion outlet orifice (74). A second fuel delivery circuit (78) connects a second diffusion outlet orifice (82) to the first fuel delivery circuit through a pressure-regulated valve (86). Fuel is delivered to the second diffusion outlet orifice only when the fuel pressure in the first fuel delivery circuit is above a predetermined fuel pressure. At low fuel flow rates, the valve to the second fuel delivery circuit is closed, thereby generating a relatively high nozzle pressure drop across the first diffusion outlet orifice. This relatively high pressure drop makes the system less susceptible to acoustic instabilities that may otherwise result from feedback between the combustion dynamics and the fuel system.

11 Claims, 3 Drawing Sheets

GAS TURBINE PILOT BURNER AND METHOD

BACKGROUND OF THE INVENTION

The present invention relates generally to the field of gas turbine engines, and more particularly to a pilot burner for a gas fired combustor.

FIG. 1 is a schematic diagram of a typical prior art gas turbine engine 10. A compressor 12 draws in ambient air 14 and delivers compressed air 16 to a combustor 18. A fuel supply 20 delivers fuel 22 to combustor 18 where it is combined with the compressed air to produce high temperature combustion gas 24. The combustion gas 24 is expanded through a turbine 26 to produce shaft horsepower for driving the compressor 12 and a load such as an electrical generator 28. The expanded gas 30 is either exhausted to the atmosphere directly, or in a combined cycle plant, is exhausted to atmosphere through a heat recovery steam generator (not shown).

FIG. 2 illustrates one embodiment of combustor 18 where the compressed air 16 and fuel 22 are premixed in a premix section 32 of the combustor 18 upstream of a combustion zone 34 in order to promote a lean, clean-burning, efficient combustion process. Such lean combustion may become unstable, especially during transient conditions. To ensure stable combustion, a fuel-rich diffusion mixture flame 36 may be provided to the combustion zone by a pilot burner 38. Fuel is injected through the pilot burner 38 directly into the combustion zone 34 without premixing with air. Combustion is initiated in the combustor 18 with a pilot flame by providing fuel through a fuel tube 40 that is centrally disposed within the combustor 18. The fuel tube 40 is centrally located within a shell 41. The shell 41 has an inlet end 43 for receiving compressed air 16 and an outlet end 45. A swirl vane 47 may be located proximate the outlet end 45. Fuel tube 40 has an outlet end 42 with a plurality of pilot fuel nozzle openings 44 formed therein for providing a flow of pilot fuel 46 for mixing with the compressed air 16 exiting swirl vane 47. This fuel-air mixture supports the pilot diffusion flame 36. A main fuel flow 22 is provided to the premix section 32 by main fuel nozzles 48 for combusting in the combustion zone 34. The pre-mix combustion is supported by the pilot diffusion flame. Power is increased first by increasing the flow of pilot fuel 46, and then by gradually increasing the main fuel flow 22 as the flow of pilot fuel 46 is decreased. Under full power conditions, the pilot fuel flow rate is decreased in order to reduce undesirable emissions into the atmosphere. Under low power and transient power conditions, the ratio of pilot fuel to total fuel flow may be as high as 50%. Thus, the pilot burner 38 must be designed to deliver enough fuel to produce as much as 30–40% of the rated power level of the engine 10. Since the maximum supply pressure of fuel is fixed, the size of the pilot fuel nozzle openings 44 must be made sufficiently large to ensure that an adequate flow rate of pilot fuel 46 can be provided at the lower power conditions. This opening size then determines the pressure differential across the pilot fuel nozzles 44. Once the pilot fuel flow 46 is decreased at full power conditions, the differential pressure across pilot fuel nozzle openings 44 may become unacceptably low, making the pilot flame susceptible to instability and even flame-out due to relatively minor fluctuations in fuel supply pressure. Since pressure drop is approximately proportional to the square of the mass flow (Mach number<0.8), a turndown of 20 to 1 means that the pressure drop at the low pilot flows typical of base load are approximately $1/400^{th}$ of the pressure drop at the highest pilot flows typical of full power engine operation.

A pre-mix pilot burner design recently developed by Siemens Westinghouse Power Corporation provides a portion of the pilot fuel flow through premix pilot fuel outlet orifices 50 located on swirl vane members 52 upstream of the outlet end 42 of the pilot fuel tube 40. Other geometries associating a premix fuel supply outlet and a swirl member may also be used. This innovation reduces the undesirable emissions produced by a pilot burner 38 by premixing all or a portion of the pilot fuel flow, however, as the diffusion portion of the pilot fuel flow is decreased, the pressure differential across the pilot burner diffusion nozzles 44 is further decreased.

U.S. Pat. No. 5,036,657 issued to Seto, et al., describes a dual manifold fuel system for a liquid-fueled turbofan engine for aircraft propulsion. Two sets of main fuel outlets are provided, with one set always fueled and the second set fueled along with the first set only at higher flow rates. A valve controlling the flow through the second set of outlets is computer controlled, using inputs such as fuel flow, air flow, weight on wheels, and other engine and flight parameters. U.S. Pat. No. 4,499,735 issued to Moore, et al., also describes a liquid fuel injection system for an aircraft gas turbine engine. The main fuel supply to the combustor is divided into a plurality of radially displaced zones and a plurality of circumferentially displaced segments. Fuel distribution is varied across the zones and across the segments during various conditions of operation of the engine in order to provide improved temperature control, fuel atomization, and ignition control. Such complicated fuel system designs are useful for addressing the unique problems presented by the main fuel supply of a liquid-fueled aviation engine, but they do not solve or even address the issue of inadequate pilot fuel nozzle differential pressure in a gas-fueled turbine engine.

U.S. Pat. No. 5,901,555 issued to Mandai, et al., does address the issue of inadequate pilot fuel nozzle differential pressure by dividing the pilot burner diffusion fuel flow into at least two independent systems. The fuel nozzle diameters of each system are different, and each system can be controlled independently. While such a system does provide improved control over the fuel nozzle differential pressure, it is costly to manufacture such redundant systems and more complex to operate an engine containing such independent systems.

SUMMARY OF THE INVENTION

Accordingly, a simple, less expensive approach is described herein to assure that adequate differential pressure is maintained across the pilot fuel nozzles of a gas turbine combustor, in particular, a gas turbine having an advanced premixed pilot design. The present inventor has discovered that improved gas-fueled pilot burner performance may be achieved by dividing the diffusion pilot fuel flow into two circuits. A first circuit delivers fuel to a first outlet nozzle, and a second circuit delivers fuel from the first circuit to a second outlet nozzle only when the fuel pressure in the first circuit exceeds a predetermined value. The second circuit may be connected to the first circuit through a spring-loaded relief valve.

In one embodiment, a fuel delivery arrangement for a gas-fueled combustor pilot burner is described as including: a first fuel delivery circuit having an inlet connected to a supply of gaseous fuel and having a first outlet opening disposed in a pilot fuel burner; and a second fuel delivery circuit having an inlet connected to the first fuel delivery circuit and having a second outlet opening disposed in the pilot burner. The fuel delivery arrangement may further include a pressure-regulated valve connected between the first fuel delivery circuit and the inlet of the second fuel delivery circuit for providing gaseous fuel to the second fuel delivery circuit only when a fuel pressure in the first fuel delivery circuit exceeds a predetermined fuel pressure. The pressure-regulated valve may be a spring-release valve.

A pilot burner for a gaseous fuel combustor is described herein as including: a first gaseous fuel delivery circuit having a first outlet disposed within a combustor, a flow of gaseous fuel through the first gaseous fuel delivery circuit being responsive to a fuel flow control system; and a second gaseous fuel delivery circuit having a second outlet disposed within the combustor and having an inlet connected to the first gaseous fuel delivery circuit through a pressure-regulated valve, a flow of gaseous fuel through the second gaseous fuel delivery circuit being responsive to fuel pressure in the first gaseous fuel delivery circuit. The pilot burner may further include a spring-release valve connected between the first gaseous fuel delivery circuit and an inlet of the second gaseous fuel delivery circuit, the spring-release valve adapted to allow the flow of gaseous fuel through the second gaseous fuel delivery circuit only when the fuel pressure in the first gaseous fuel delivery circuit exceeds a predetermined pressure.

In another embodiment, a pilot burner for a gas turbine combustor is described as including: a shell having an inlet end for receiving combustion air and an outlet end for releasing a fuel-air mixture; a premix fuel supply outlet within the shell and a swirl member associated with the premix fuel supply outlet; a first diffusion fuel delivery circuit having an outlet within the shell downstream of the premix fuel supply outlet; and a second diffusion fuel delivery circuit having an outlet within the shell downstream of the premix fuel supply outlet, the second diffusion fuel delivery circuit having an inlet connected to the first diffusion fuel delivery circuit through a pressure-regulated valve. The pressure-regulated valve may be a spring-release valve.

A method of providing fuel to a gas turbine combustor pilot burner is described herein as including the steps of: providing a gaseous fuel supply; providing a first fuel delivery circuit having an inlet connected to the gaseous fuel supply and having an outlet in the pilot burner; providing a second fuel delivery circuit having an inlet connected to the first fuel delivery circuit through a pressure-regulated valve and having an outlet in the pilot burner; controlling the fuel supply to deliver fuel at a first pressure wherein the pressure-regulated valve remains closed and fuel is delivered to the pilot burner through the first fuel delivery circuit and not through the second fuel delivery circuit; and controlling the fuel supply to deliver fuel at a second pressure higher than the first pressure wherein the pressure-regulated valve is opened and fuel is delivered to the pilot burner through the first fuel delivery circuit and through the second fuel delivery circuit. The method may further include the steps of: providing the outlet of the first fuel delivery circuit with at least one outlet orifice; providing the outlet of the second fuel delivery circuit with at least one outlet orifice; selecting the first and second fuel delivery circuit outlet orifices and selecting a pressure-regulated valve opening pressure so that a flame generated by the pilot burner will remain stable when the fuel supply is controlled to deliver fuel at the first pressure and when it is controlled to deliver fuel at the second pressure. The second fuel delivery circuit may be connected to the first fuel delivery circuit through a spring-loaded valve.

DETAILED DESCRIPTION OF THE INVENTION

Figure 1:
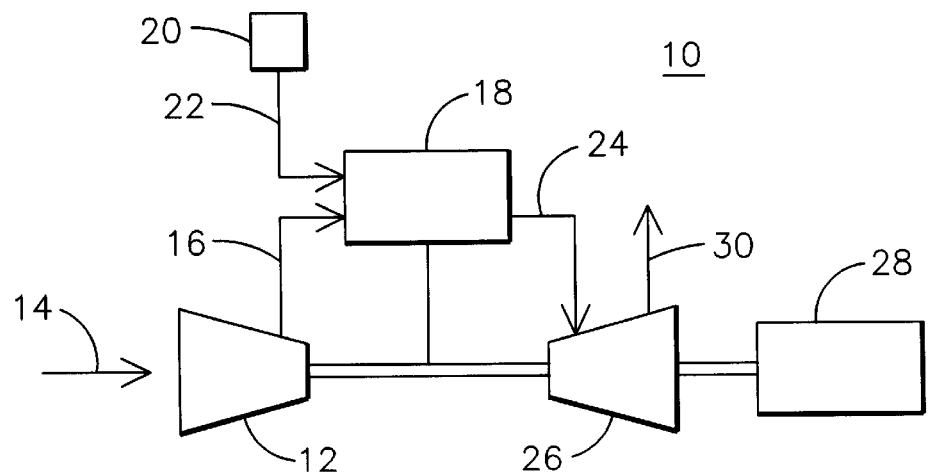
FIG. 1 is a schematic illustration of a prior art gas turbine engine.
Figure 3:
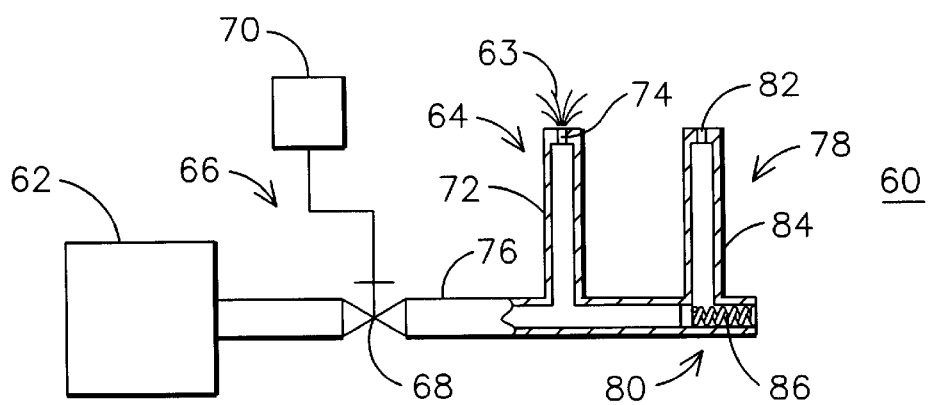
FIG. 3 is a schematic illustration of a gas pilot fuel arrangement having a first circuit and having a second circuit connected to the first circuit through a spring operated valve.

A fuel delivery arrangement 60 for a gaseous fuel combustor pilot burner is illustrated in FIG. 3. Fuel delivery arrangement 60 may be used to provide a gas pilot fuel flow to a combustor 18 of a gas turbine 10, such as those illustrated in FIGS. 1 and 2.

A supply 62 of a gaseous fuel, for example natural gas 63, is provided to a first fuel delivery circuit 64 through a fuel flow control system 66. The fuel flow control system 66 may be any scheme known in the art for providing fuel at a range of pressures and flow rates as required to support the operation of a gas turbine engine. In one embodiment, the fuel flow control system 66 may include a flow control valve 68 controlled by a microprocessor-based control logic 70 as is known in the art. The flow of gaseous fuel through the first fuel delivery circuit 64 is thus actively controlled by and is responsive to the fuel flow control system 66.

First flow delivery circuit 64 includes a fuel tube 72 having at least one outlet opening orifice 74 disposed in a combustor of a gas turbine for providing a diffusion pilot flame. First flow delivery circuit 74 also includes appropriate piping 76 for interconnecting the fuel tube 72 and flow control valve 68.

Fuel delivery arrangement 60 also includes a second fuel delivery circuit 78 having an inlet 80 connected to the first fuel delivery circuit 64 and having an outlet opening orifice 82 disposed in the combustor of the gas turbine proximate the outlet 74 of the first fuel delivery circuit 64. The second fuel delivery circuit 78 may further include piping and/or a fuel tube 84 interconnecting the inlet 80 and the outlet 82. The inlet 80 of the second fuel delivery circuit 78 is connected to the first fuel delivery circuit 64 through a spring-release valve 86 or other such pressure-regulated device so that the gaseous fuel 63 is delivered to the combustor through outlet orifice 82 only when the fuel pressure in the first fuel delivery circuit 64 exceeds a predetermined value. The flow of gaseous fuel through the second fuel delivery circuit 78 is thus passively controlled by and is responsive to a fuel pressure in the first fuel delivery circuit 64.

Figure 4:
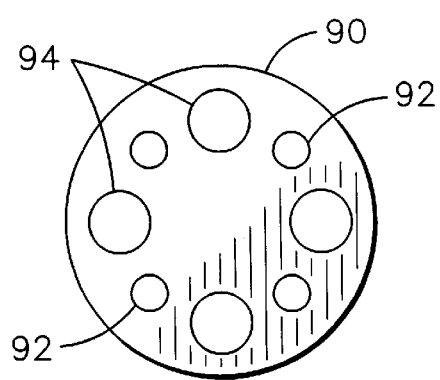
FIG. 4 is an end view of a fuel delivery tube having a first plurality of orifices that may be connected to the first circuit of FIG. 3 and a second plurality of orifices that may be connected to the second circuit of FIG. 3.

The pilot diffusion gas injection is divided into two circuits 64, 78 in fuel delivery arrangement 60. These circuits may or may not have identical outlet orifice geometries. FIG. 4 illustrates an end view of a fuel tube 90 of a gas turbine combustor as may be used with a fuel delivery arrangement 60 of FIG. 3. A first plurality of outlet orifices 92 each having a first diameter may be in fluid communication with a first fuel delivery circuit such as circuit 64 of FIG. 3. A second plurality of outlet orifices 94 each having a second diameter may be in fluid communication with a second fuel delivery circuit such as circuit 78 of FIG. 3. Both sets of orifices 92, 94 are formed in an outlet end of fuel tube 90. As illustrated, the first diameter is smaller than the second diameter, although other relative sizes may be used to achieve a desired pressure drop and fuel delivery rate. Furthermore, a single orifice or a plurality of orifices may be associated with each fuel delivery circuit. Fuel is allowed to flow through the first plurality of orifices 92 unimpeded from flow control valve 68. Fuel is allowed to flow through the second plurality of outlet orifices 94 only when the fuel supply pressure in the first fuel delivery circuit 64 exceeds a predetermined value. In this manner, a broad range of total pilot diffusion fuel flow rates may be achieved while maintaining a desired pressure drop across the respective plurality of orifices 90, 92.

Figure 5:
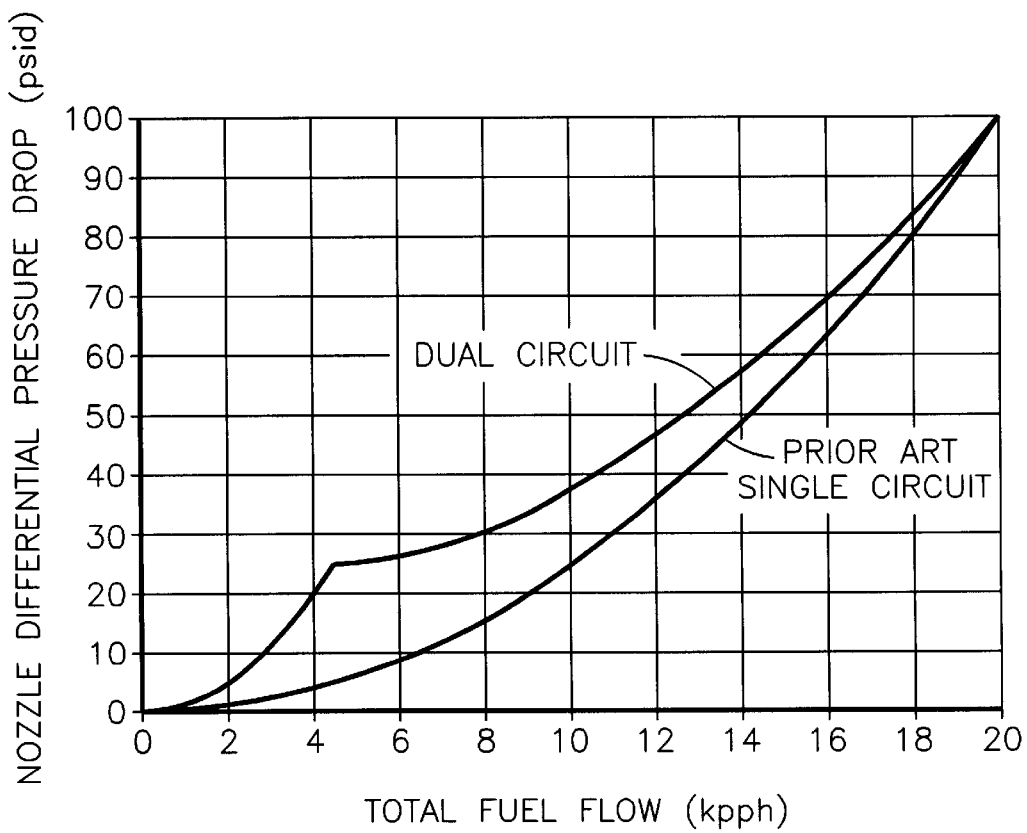
FIG. 5 illustrates the nozzle pressure drop across outlet orifices as a function of fuel flow rate for a prior art combustor and for a dual circuit combustor.
Figure 6:
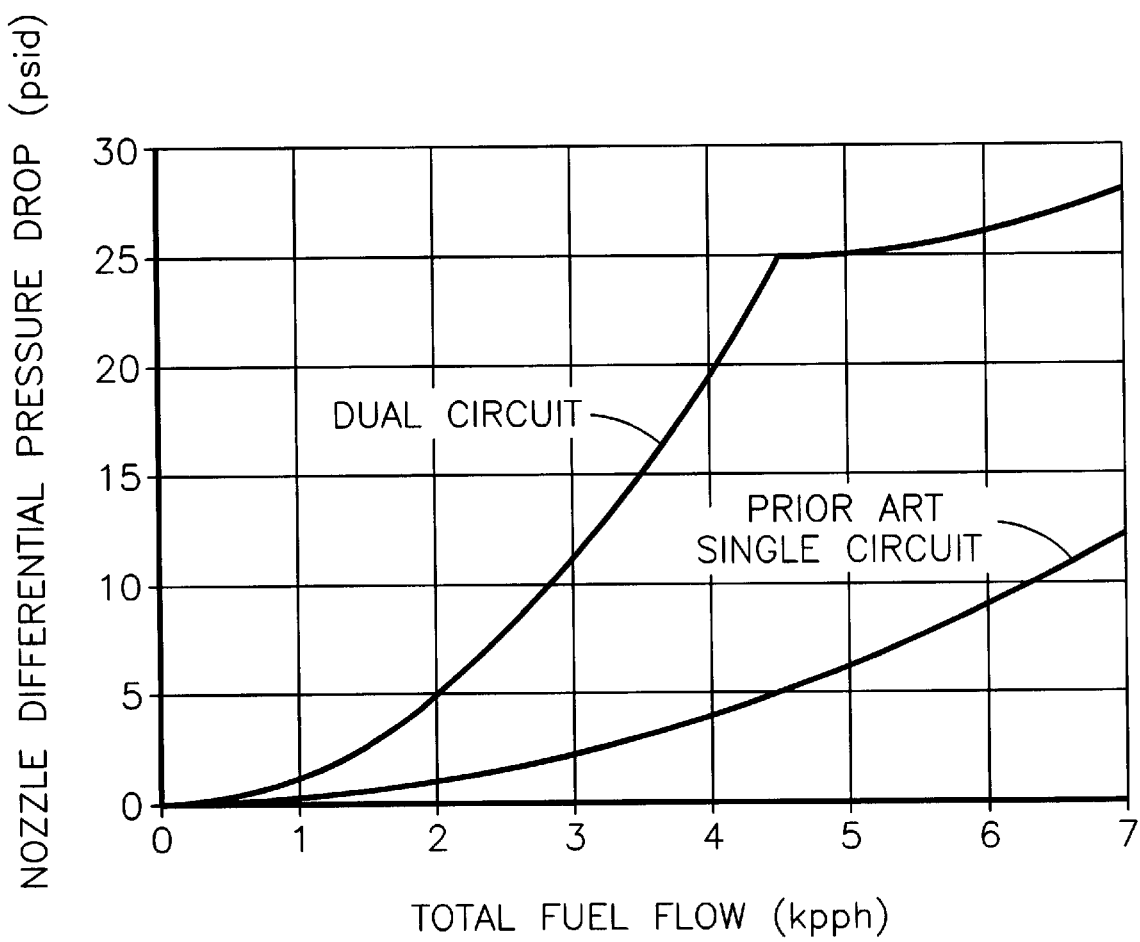
FIG. 6 is an expanded view of the low flow portion of FIG. 5.

FIG. 5 shows a comparison of a hypothetical prior art single circuit nozzle fuel delivery system and a hypothetical dual circuit nozzle fuel delivery system. Flow number may be defined as the ratio of fuel flow to the square root of differential pressure. The assumed flow number for the single circuit nozzle fuel delivery system is 2. For the dual circuit configuration, the pressure-regulated valve between the two circuits remains closed until the pilot nozzle pressure differential exceeds 25 psid. The assumed flow number for the first leg of the dual circuit fuel delivery system is 0.9. The flow number of the second leg was adjusted by changing the fuel injection nozzle outlet orifice hole size until the same total fuel flow was achieved in the dual circuit fuel delivery system as in the single fuel delivery system at 100 psid fuel nozzle pressure differential. The resulting flow number for the second leg was 1.27. Thus, at high flow rates, the pressure requirements for both fuel delivery systems is nearly identical. However, the dual circuit approach provides higher differential pressures than does the prior art single circuit approach at the lower pilot fuel flows typical of base load operation. This can be seen more clearly in FIG. 6, which is an expanded view of the low flow portion of FIG. 5. For instance, the single circuit nozzle pressure differential is only 5 psid at 4.5 kpph fuel flow. Hence, this pressure differential is on the same order of magnitude as the combustion-driven pressure oscillations within the combustion system. Such oscillations may give rise to fluctuations in pilot fuel flow and may set up undesirable acoustic feedback mechanisms between the pilot fuel delivery system and the combustor. On the other hand, the dual circuit approach has a pilot fuel system pressure differential of 25 psid at that same fuel flow rate. The dual circuit system is more acoustically "stiff" and, hence, would be much less susceptible to combustion-driven oscillations and potential feedback mechanisms between the combustor and the fuel delivery system.

Figure 2:
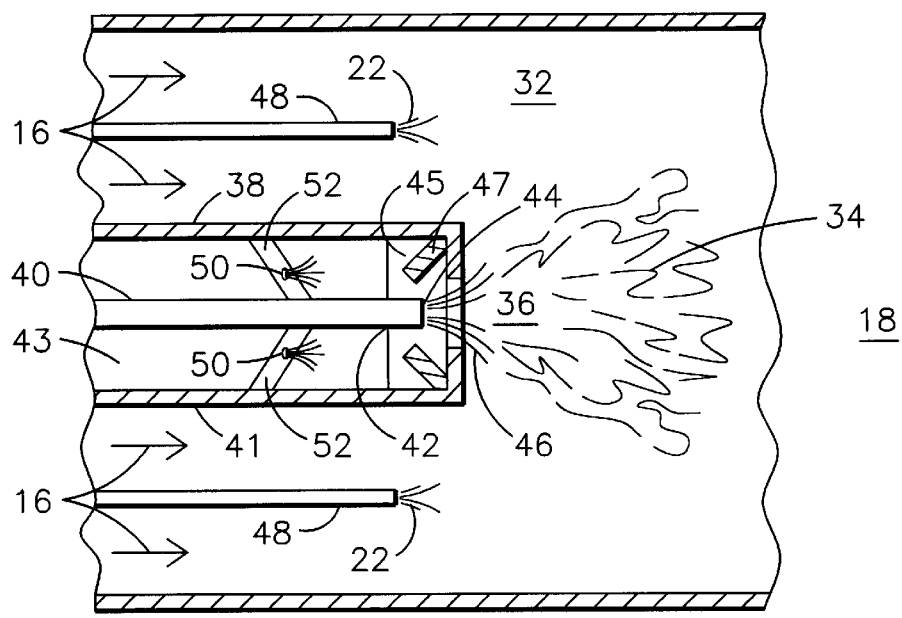
FIG. 2 is a partial cross-sectional view of the combustor of the prior art gas turbine engine of FIG. 1.

A dual circuit pilot fuel delivery arrangement may be used with the pre-mix pilot concept illustrated in FIG. 2. In lieu of the single circuit outlet orifices 44 of the prior art, the dual circuit outlet orifices 74, 82 may be formed at the outlet end 42 of fuel tube 40 downstream of pre-mix pilot fuel outlets 50. In operation, a gaseous fuel 63 may be provided over a range of fuel pressures to a first fuel delivery circuit 64 in fluid communication with the first diffusion outlet orifice 74. A second diffusion fuel delivery circuit 78 in fluid communication with the second diffusion outlet orifice 82 is connected to the first fuel delivery circuit 64. A portion of the gaseous fuel is allowed to flow from the first fuel delivery circuit 64 to the second outlet orifice 82 only when the fuel pressure in the first fuel delivery circuit 64 exceeds a predetermined pressure. By proper selection of the size of the opening in the first outlet orifice 74 and the second outlet orifice 82, as well as selection of the predetermined pressure at which the flow into the second fuel delivery circuit 78 is initiated, it is possible to maintain the differential pressures across each of the first and second outlet orifices 74, 82 above predetermined values so that the diffusion flame will remain stable over the full range of pressures in the first fuel delivery circuit 64. Such selections may be accomplished with known fluid systems calculation techniques.

In one embodiment, pressure-operated valve 86 may be a passive device such as a spring-release relief valve of any design known in the art. Alternatively, valve 86 may be a power-operated valve responsive to an active control system sensing fuel pressure in the first fuel delivery circuit 64. Valve 86 may be located outside of the combustor 18, or in one embodiment may be located within the combustor 18 or within the fuel tube shell 41, thereby minimizing the additional piping that would be required for the second fuel delivery circuit 78.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A pilot burner for a gaseous fuel combustor, the pilot burner comprising:

a first gaseous diffusion fuel delivery circuit having a first outlet disposed within a combustor, a flow of gaseous fuel though the first gaseous fuel delivery circuit being responsive to a fuel flow control system; and a second gaseous diffusion fuel delivery circuit having a second outlet disposed within the combustor and having an Inlet connected to the first gaseous diffusion fuel delivery circuit through a pressure-regulated valve, a flow of gaseous fuel through the second gaseous diffusion fuel delivery circuit being responsive to a fuel pressure in the first gaseous diffusion fuel delivery circuit, said pressure-regulated valve being constructed and arranged to permit said flow of gaseous fuel through said second gaseous diffusion fuel delivery circuit while said fuel pressure is above a first predetermined value selected to maintain a differential pressure across said first outlet orifice above a second predetermined value and a differential pressure across said second outlet orifice above a third predetermined value, said second and third predetermined values being selected to maintain stable burning of said diffusion fuel ensured as said fuel pressure varies.

2. The pilot burner of claim 1, further comprising a spring-release valve connected between the first gaseous fuel delivery circuit and the inlet of the second gaseous fuel delivery circuit, the spring-release valve adapted to allow the flow of gaseous fuel through the second gaseous fuel delivery circuit only when the fuel pressure in the first gaseous fuel delivery circuit exceeds a predetermined pressure.

3. The pilot burner of claim 1, further comprising:

a fuel tube having an outlet end disposed within the combustor;

the first outlet comprising a first plurality of fuel discharge openings formed in the fuel tube outlet end; and the second outlet comprising a second plurality of fuel discharge openings formed in the fuel tube outlet end.

4. A pilot burner for a gas turbine combustor comprising:

a shell having an inlet end for receiving combustion air and an outlet end for releasing a fuel-air mixture;

a premix fuel supply outlet within the shell and a swirl member associated with the premix fuel supply outlet;

a first diffusion fuel delivery circuit having an outlet within the shell downstream of the premix fuel supply outlet; and a second diffusion fuel delivery circuit having an outlet within the shell downstream of the premix fuel supply outlet, the second diffusion fuel delivery circuit having an inlet connected to the first diffusion fuel delivery circuit through a pressure-regulated valve.

5. The pilot burner of claim 4, wherein the pressure-regulated valve comprises a spring-release valve.

6. The pilot burner of claim 4, further comprising:

a fuel tube centrally disposed within the shell and having an outlet end disposed downstream of the premix fuel supply outlet;

the first diffusion fuel delivery circuit comprising a first outlet orifice disposed in the outlet end of the fuel tube; and the second diffusion fuel delivery circuit comprising a second outlet orifice disposed in the outlet end of the fuel tube proximate the first outlet orifice.

7. A method of providing fuel to a gas turbine combustor pilot burner comprising:

providing a gaseous fuel supply;

providing a first fuel delivery circuit having an inlet connected to the gaseous fuel supply and having an outlet in a pilot burner;

providing a second fuel delivery circuit having an inlet connected to the first fuel delivery circuit through a pressure-regulated spring-release valve and having an outlet in the pilot burner, controlling the gaseous fuel supply to deliver fuel at a first pressure wherein the pressure-regulated valve remains closed and fuel is delivered to the pilot burner through the first fuel delivery circuit and not through the second fuel delivery circuit; and controlling the gaseous fuel supply to deliver fuel at a second pressure higher than the first pressure wherein the pressure-regulated spring-release valve is opened and fuel is delivered to the pilot burner through the first fuel delivery circuit and through the second fuel delivery circuit.

8. The method of claim 7, further comprising:

providing the outlet of the first fuel delivery circuit with at least one outlet orifice;

providing the outlet of the second fuel delivery circuit with at least one outlet orifice; and selecting the first and second fuel delivery circuit outlet orifices and selecting a pressure-regulated valve opening pressure so that a flame generated by the pilot burner remains stable when the gaseous fuel supply is controlled to deliver fuel at the first pressure and when the gaseous fuel supply is controlled to deliver fuel at the second pressure.

9. A method of providing fuel to a gas turbine combustor pilot burner comprising:

providing a gaseous diffusion fuel supply;

providing a first diffusion fuel delivery circuit having an inlet connected to the gaseous fuel supply and having an outlet in a pilot burner;

providing a second diffusion fuel delivery circuit having an inlet connected to the first fuel delivery circuit through a pressure-regulated valve and having an outlet in the pilot burner;

controlling the gaseous diffusion fuel supply to deliver fuel at a first pressure wherein the pressure-regulated valve remains closed and diffusion fuel is delivered to the pilot burner through the first fuel delivery circuit and not through the second fuel delivery circuit; and controlling the gaseous diffusion fuel supply to deliver fuel at a second pressure higher than the first pressure wherein the pressure-regulated valve is opened and fuel is delivered to the pilot burner through the first diffusion fuel delivery circuit and through the second diffusion fuel delivery circuit, said first and second fuel pressures being selected to maintain a differential pressure across said first outlet orifice above a second predetermined value and a differential pressure across said second outlet orifice above a third predetermined value, said second and third predetermined values being selected to maintain stable burning of said diffusion fuel ensured as said fuel pressure varies.

10. The method of claim 9, further comprising:

providing the outlet of the first diffusion fuel delivery circuit with at least one outlet orifice;

providing the outlet of the second diffusion fuel delivery circuit with at least one outlet orifice; and selecting the first and second diffusion fuel delivery circuit outlet orifices and selecting a pressure-regulated valve opening pressure so that a diffusion flame generated by the pilot burner remains stable when the gaseous diffusion fuel supply is controlled to deliver diffusion fuel at the first pressure and when the gaseous diffusion fuel supply is controlled to deliver diffusion fuel at the second pressure.

11. The method of claim 9, further comprising connecting the second diffusion fuel delivery circuit to the first diffusion fuel delivery circuit through a spring-release valve.

* * * * *